United States Patent [19]
Hata

[11] Patent Number: 4,720,181
[45] Date of Patent: Jan. 19, 1988

[54] LARGE APERATURE RATIO ZOOM LENS SYSTEM

[75] Inventor: Kazuyoshi Hata, Sakai, Japan

[73] Assignee: Minolta Camera Kabushiki Kaisha, Osaka, Japan

[21] Appl. No.: 786,657

[22] Filed: Oct. 11, 1985

[30] Foreign Application Priority Data

Oct. 12, 1985 [JP] Japan ................... 59-214787

[51] Int. Cl.⁴ .................... G02B 15/16; G02B 9/64
[52] U.S. Cl. ................................................ 350/427
[58] Field of Search ..................................... 350/427

[56] References Cited
U.S. PATENT DOCUMENTS 3,336,094  8/1967  Macher ................. 350/427

Primary Examiner—John K. Corbin
Assistant Examiner—Rebecca D. Gass
Attorney, Agent, or Firm—Price, Gess & Ubell

[57] ABSTRACT

A large aperture ratio zoom lens system is provided for use in a video camera. The lens system includes a first lens unit of a positive refractive power, a second lens of a negative refractive power, a third lens unit of a negative refractive power, a fourth lens unit of a positive refractive power, an aperture diaphragm, and a fifth lens unit of a positive refractive power. A second lens component in the fifth lens unit has a strong negative refractive power and has a capability to correct field curvature as well as spherical aberrations.

4 Claims, 28 Drawing Figures

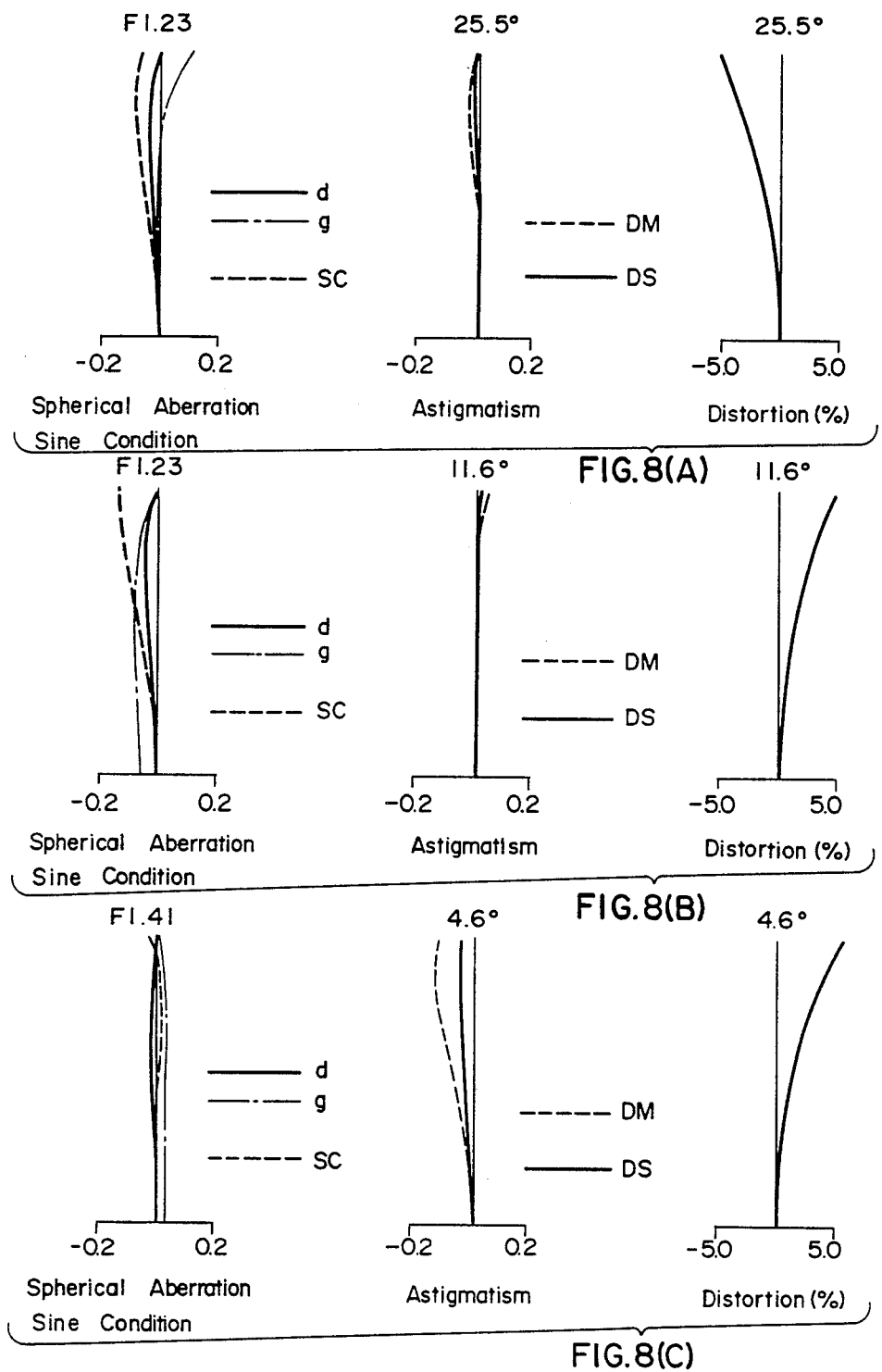

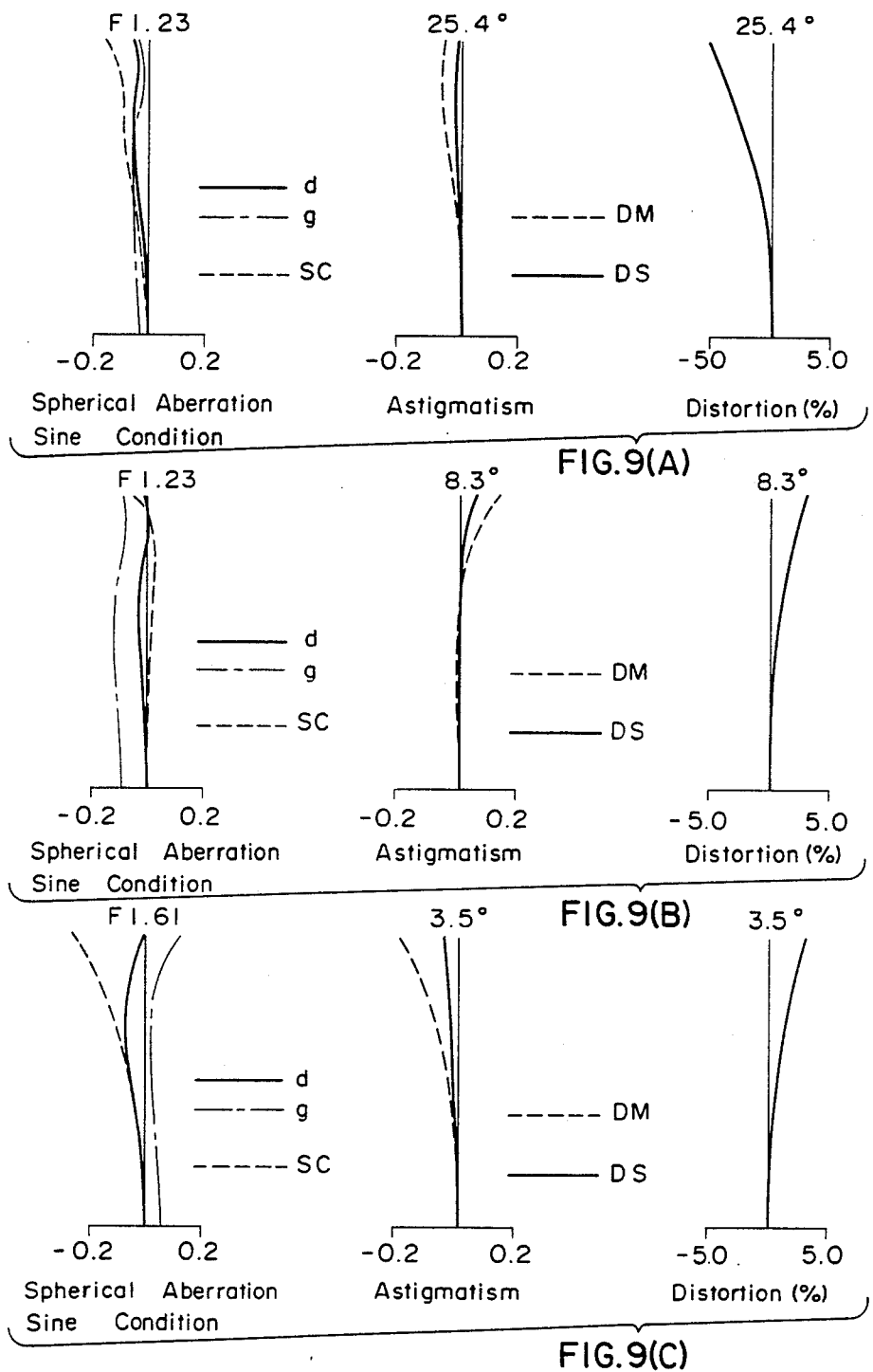

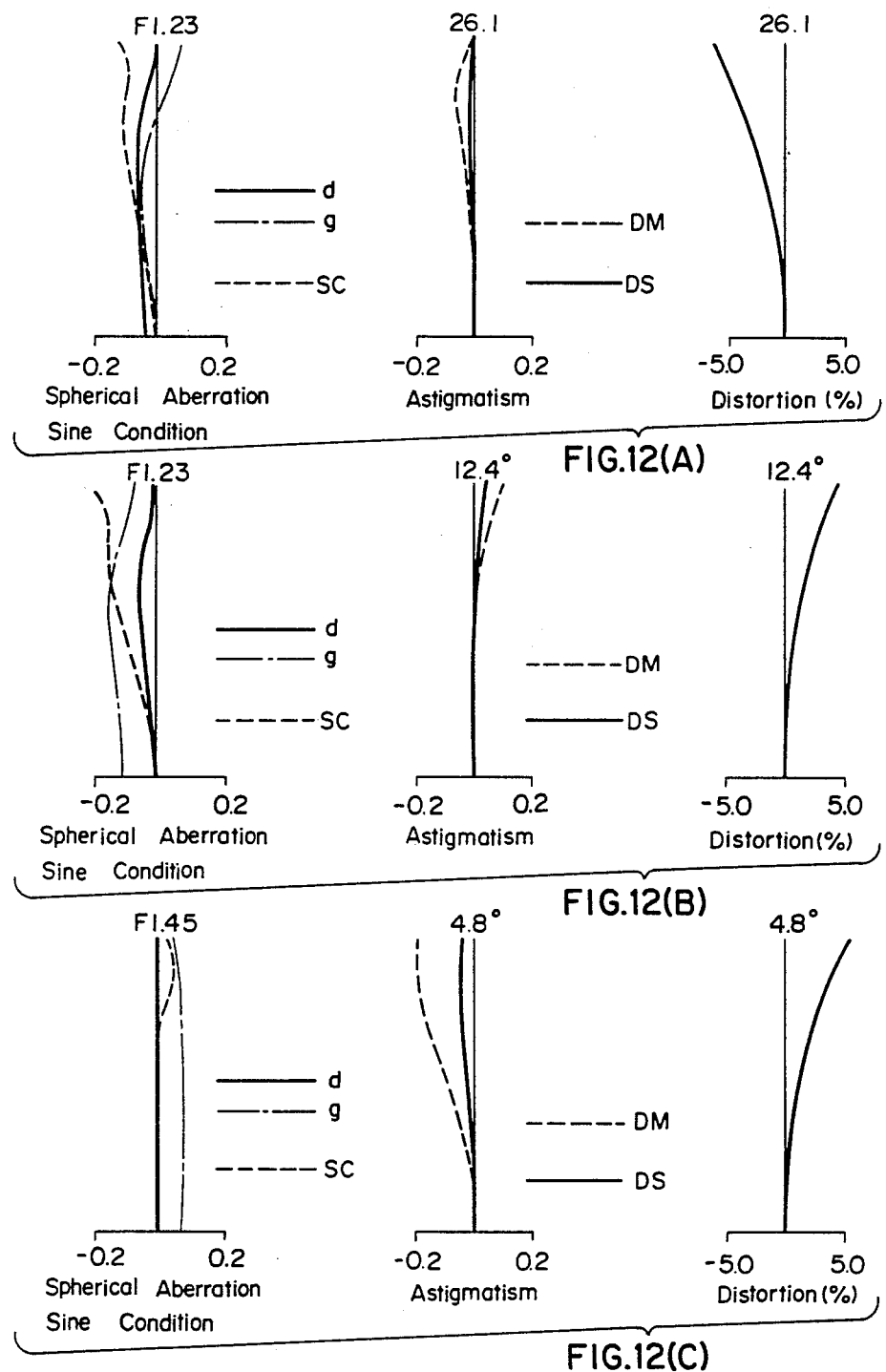

LARGE APERATURE RATIO ZOOM LENS SYSTEM

BACKGROUND OF THE INVENTION

1. Field of the Invention

The present invention relates to a zoom lens system, and more particularly to a zoom lens system suitable for a video camera system.

2. Description of the Prior Art

Video camera systems normally use image sensors, such as charge coupled devices, which have lower sensitivity than photographic film. They have many opportunities for being used in photographying an object having low brightness without illuminating means. Therefore, video camera systems require larger aperture ratio lens systems than still camera systems using photographic films do.

Furthermore, since color separation filters are located in front of a single type image pick-up tube, error color signals may occur by known "color shading" when incident light rays have a large angle with respect to an optical axis of the lens system. Thus, telecentric systems in which the exit pupil of the lens system is located at nearly an infinity position are necessary for avoiding the "color shading". Also, a relatively long back focal distance is required for the lens systems of video camera systems, since low pass filters for cutting off high frequency component, rear converters, color temperature conversion filters can frequently be mounted behind the lens systems.

Additionally, recent lens systems of video camera systems are required to be compact in size, light in weight and low in cost. The compactness of the lens systems is necessary since the lens systems account for a large amount of the size of the whole video camera system. The light weight thereof has the merit of decreasing the electric power required for shifting any lens group in an automatic focusing operation or in a zooming operation.

Compact and light zoom lens systems can be obtained by means of shifting a plurality of lens groups during the zooming operation. Such construction is known when applied to the zoom lens systems of single lens reflex camera systems. However, if it is applied to the zoom lens systems of video camera systems, the following problems can occur: In one type in which at least a lens group located in front of an aperture diaphragm and at least a lens group located behind the aperture diaphragm are shifted together in the zooming operation, it is necessary to link the both lens groups over the aperture diaphragm. However, since the automatic aperture control systems usually used in video camera systems have a relatively large diameter, the link mechanisms of the lens groups require very a large diameter of lens barrels, and therefore the compactness of the zoom lens systems is deteriorated. Furthermore, in such a type, the axial distance between the aperture diaphragm and the lens group located behind thereof is changed in the zooming operation, and therefore, the telecentric relation is deteriorated.

In the other type in which a first lens group numbered from the object side is shifted with the other lens group in the zooming operation, limit mechanisms such as cam barrels must be large compared with constructions in which the first lens group is not shifted. Therefore, it is difficult to make the zoom lens systems of video camera systems compact by applying the lens type in which the first lens group is shifted.

Additionally, the cost for manufacturing the zoom lens systems is increased in accordance with an increase of the number of lens groups shiftable in the zooming operation.

SUMMARY OF THE INVENTION

An object of the present invention is to provide a zoom lens system for video camera systems in which the minimum F-number is equal to or less than F/1.2, the zoom ratio is 6 to 8, and a sufficient back focal distance is obtained while maintaining the telecentric relation.

An other object of the present invention is to provide a zoom lens system which has the above optical performance, and which is compact, light and low in cost while maintaining a good correction of aberrations, especially with improving the contrast of low frequencies.

The features of the present invention which are believed to be novel are set forth with particularity in the appended claims. The present invention, both as to its organization and manner of operation, together with further objects and advantages thereof, may best be understood by reference to the following description, taken in conjunction with the accmpanying drawings.

To achieve the above objects, according to the present invention, a large aperture ratio zoom lens system comprising from the object side to the image side, a first lens unit of a positive refractive power, fixed in the zooming operation; a second lens unit of a negative refractive power; a third lens unit of negative refractive power; a fourth lens unit of a positive refractive power; an aperture diaphragm; and a fifth lens unit of a positive refractive power, including a front lens unit consisting of a positive first lens component whose object side surface has a stronger refractive power than its image side surface has and a negative second lens component whose object side surface has a stronger refractive power than its image side surface has, and a rear lens unit consisting of a binconvex third lens component, a negative meniscus fourth lens component whose object side surface has a stronger refractive power than its image side surface has, and a positive fifth lens component whose image side surface has stronger refractive power than its object side surface has, wherein the second lens unit and the third lens unit are shiftable along the optical axis in the zooming operation; and wherein the lens system fulfills the following conditions:

$$0.6 < |\phi_{BP}|F_V < 1.4 \quad \phi_{BP} = \frac{N_B - 1}{r_{BP}} < 0 \qquad (1)$$

$$1.2 < |\phi_{BP}|/\phi_{CF} < 2.5 \quad \phi_{CF} = \frac{1 - N_C}{r_{CF}} > 0 \qquad (2)$$

wherein, $F_V$ represents the focal length of the fifth lens unit, $N_B$ represents the refractive index of the second lens component, $N_C$ represents the refractive index of the third lens component, $r_{BP}$ represents the radius of curvature of the object side surface of the second lens component, $r_{CF}$ represents the radius of curvature of the image side surface of the third lens component, $\phi_{BP}$ represents the refractive power of the object side surface of the second lens component, and $\phi_{CF}$ represents the refractive power of the image side surface of the third lens component.

BRIEF DESCRIPTION OF THE DRAWINGS

FIGS. 8(a) to 8(c) represent the aberration curves of the fourth embodiment for the shortest focal length, for the medium focal length and for the longest focal length;

FIGS. 9(a) to 9(c) represent the aberration curves of the fifth embodiment for the shortest focal length, for the medium focal length and for the longest focal length;

FIGS. 12(a) to 12(c) represent the aberration curves of the eighth embodiment for the shortest focal length, for the medium focal length and for the longest focal length.

DETAILED DESCRIPTION OF THE PREFERRED EMBODIMENTS

Figure 1:
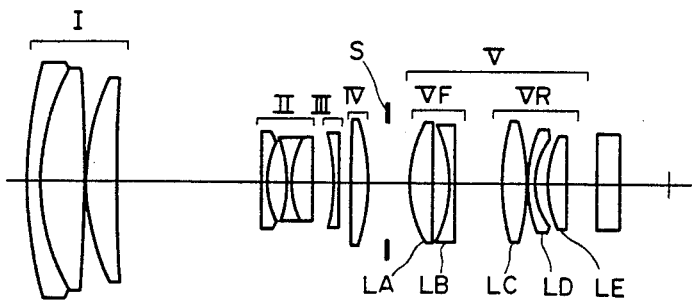
FIG. 1 represents a cross sectional view of the lens system according to a first embodiment of the present invention.

The following description is provided to enable any person skilled in the optical and camera field to make and use the invention and sets forth the best modes contemplated by the inventor for carrying our his invention. Various modifications, however, will remain readily apparent to those skilled in the art, since the generic principles of the present invention have been defined herein specifically to provide a relatively economical and easily manufactured compact zoom lens system. The derivation of the formulas and the relation of the powers set forth herein can be accomplished with the assistance of a computer. The present invention represents the parameters of a compromise balance of acceptable aberrations which can be relatively easily manufactured to provide a low cost lens system for utilization with a video camera system.

In the drawings, schematic cross sectional views disclose the position of the lens units and lens elements for the shortest focal length. Due to the number of lens elements involved, it was not deemed appropriate to include individual designation of the radii of curvature and axial distances for each lens element and air space. These values, however, are provided in the accompanying tables set forth herein, and the schematic cross sectional views of the respective embodiments follow the normal conventions of an object at the left-hand side of the drawing and the image plane at the right-hand side.

Figure 2:
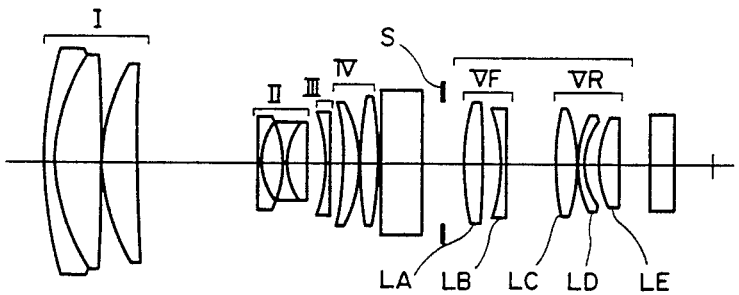
FIG. 2 represents a cross sectional view of the lens system according to second, fourth, sixth and eighth embodiments of the present invention.
Figure 3:
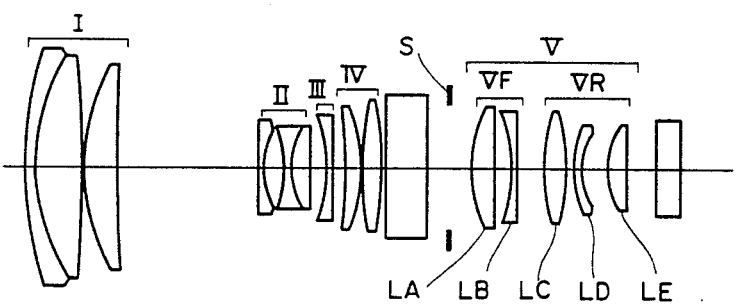
FIG. 3 represents a cross sectional view of the lens system according to a third embodiment of the present invention.
Figure 4:
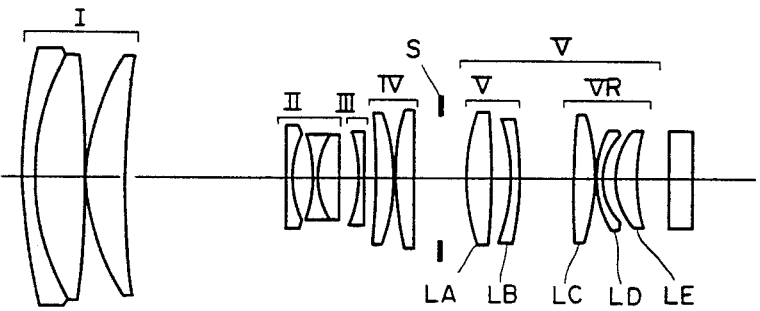
FIG. 4 represents a cross sectional view of the lens system according to fifth and seventh embodiment of the present invention.
Figure 5A:
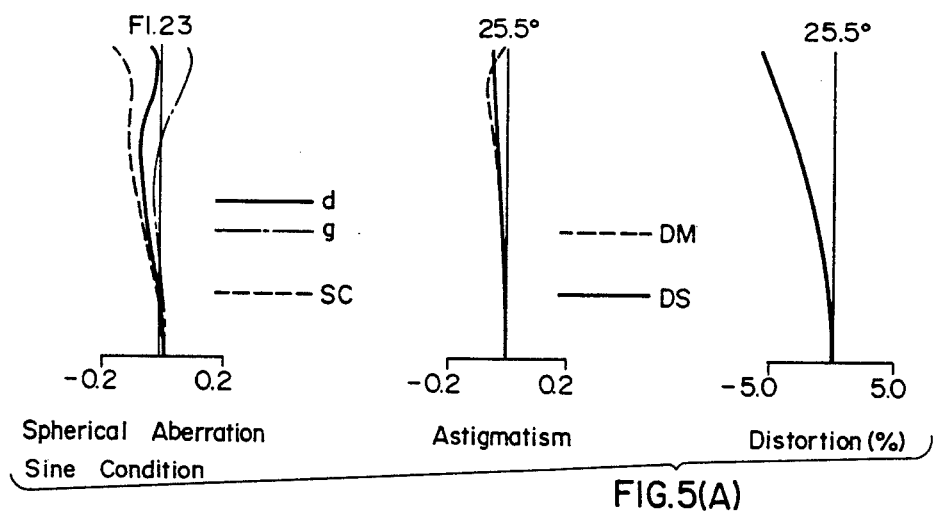
FIGS. 5(a) to 5(c) represent the aberration curves of the first embodiment for the shortest focal length, for the medium focal length and for the longest focal length.
Figure 5B:
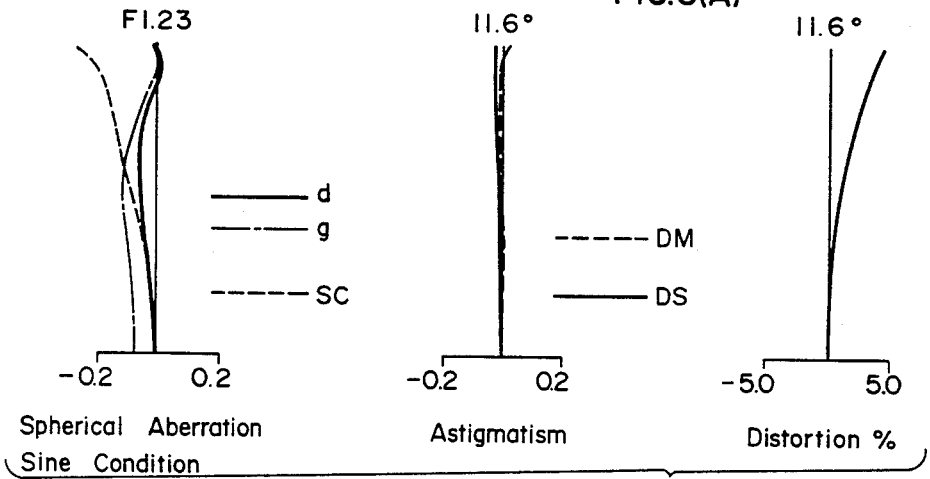
Figure 5C:
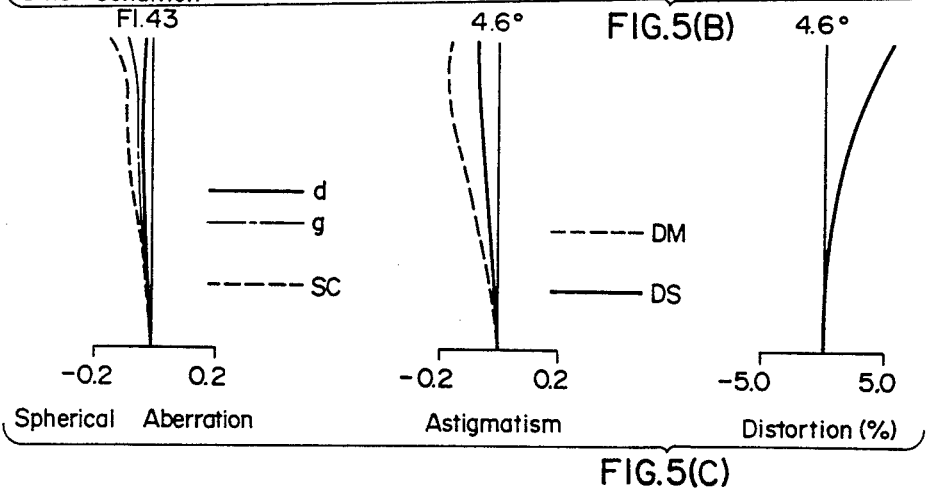
Figures 6A, 6B, 6C:
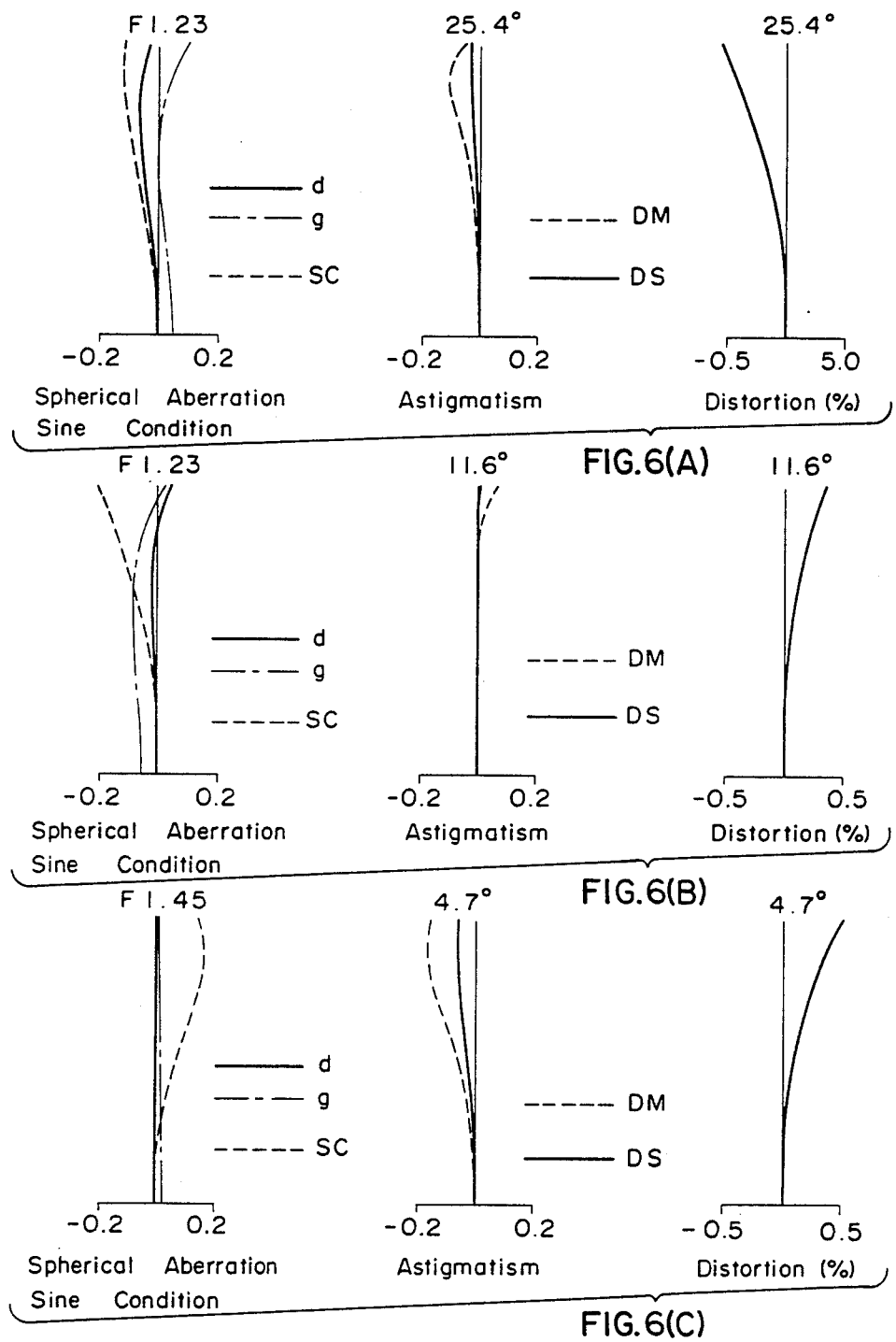
FIGS. 6(a) to 6(c) represent the aberration curves of the second embodiment for the shortest focal length, for the medium focal length and for the longest focal length.
Figure 7A:
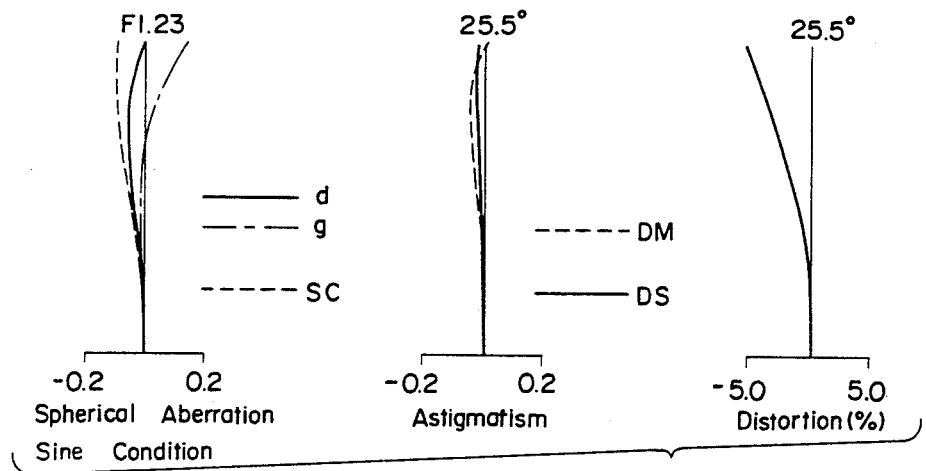
FIGS. 7(a) to 7(c) represent the aberration curves of the third embodiment for the shortest focal length, for a medium focal length and for the longest focal length.
Figure 7B:
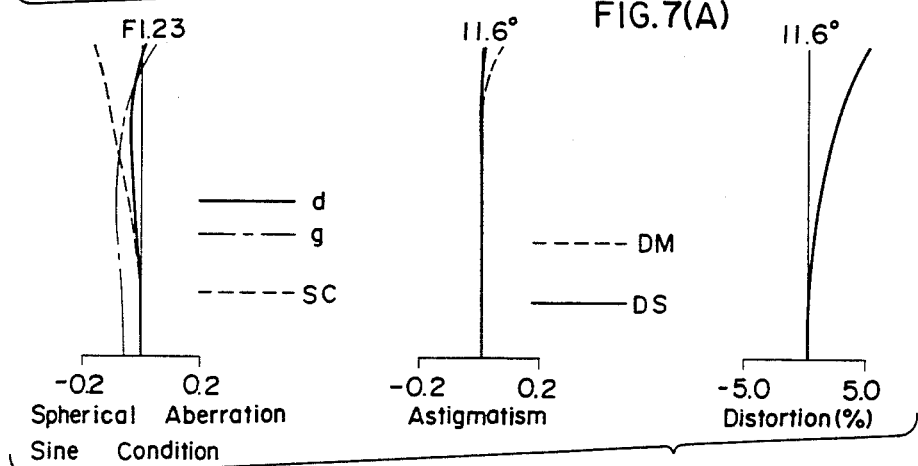
Figure 7C:
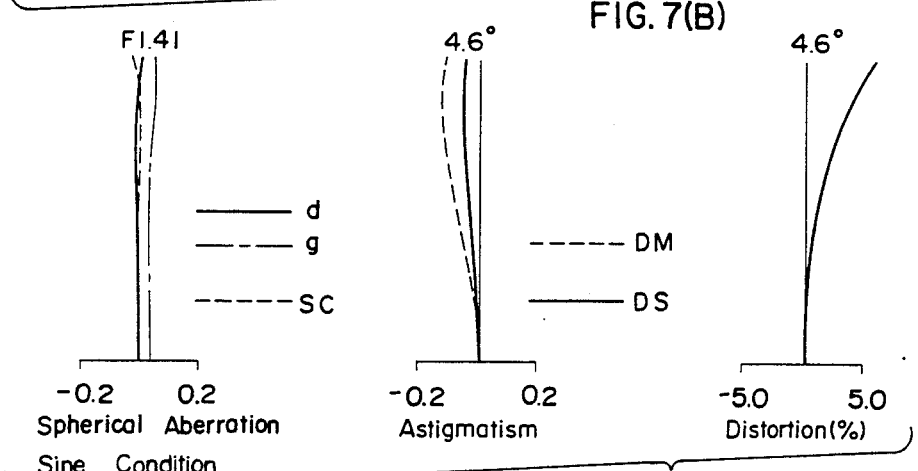
Figure 10A:
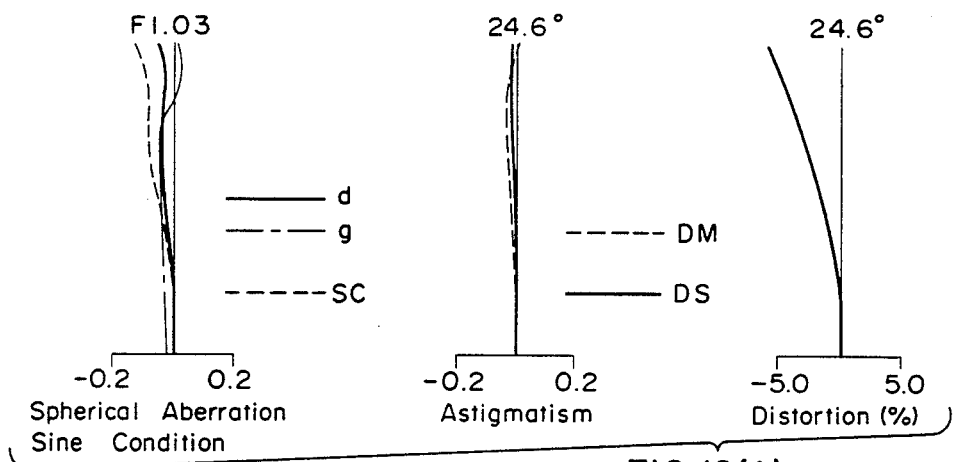
FIGS. 10(a) to 10(c) represent the aberration curves of the sixth embodiment for the shortest focal length, for the medium focal length and for the longest focal length.
Figure 10B:
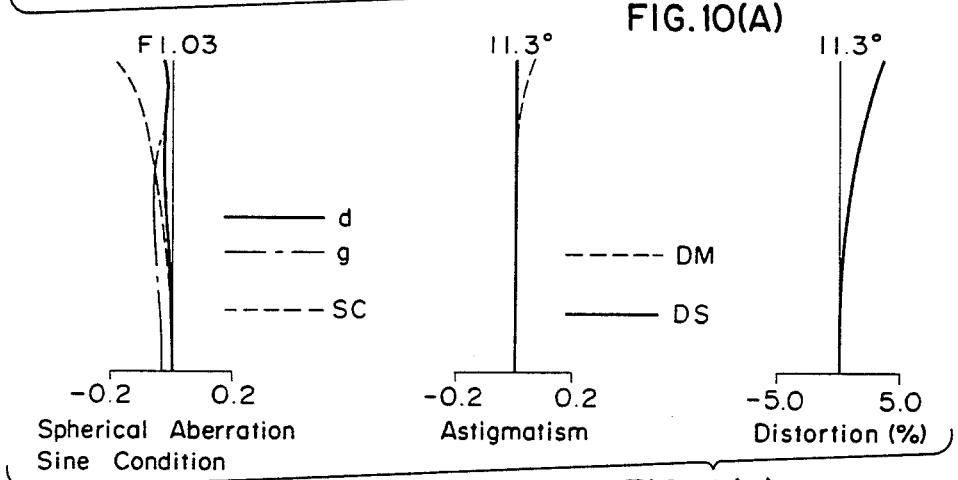
Figure 10C:
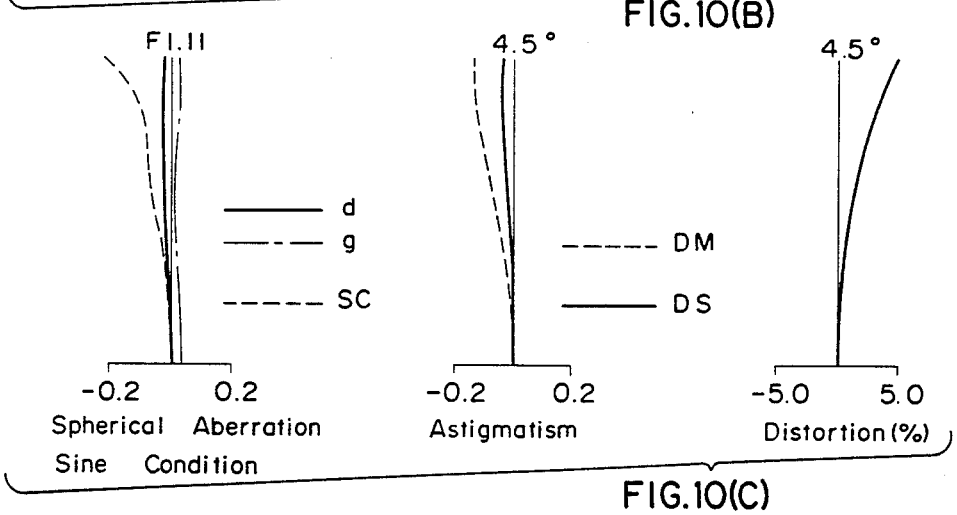
Figures 11A, 11B, 11C:
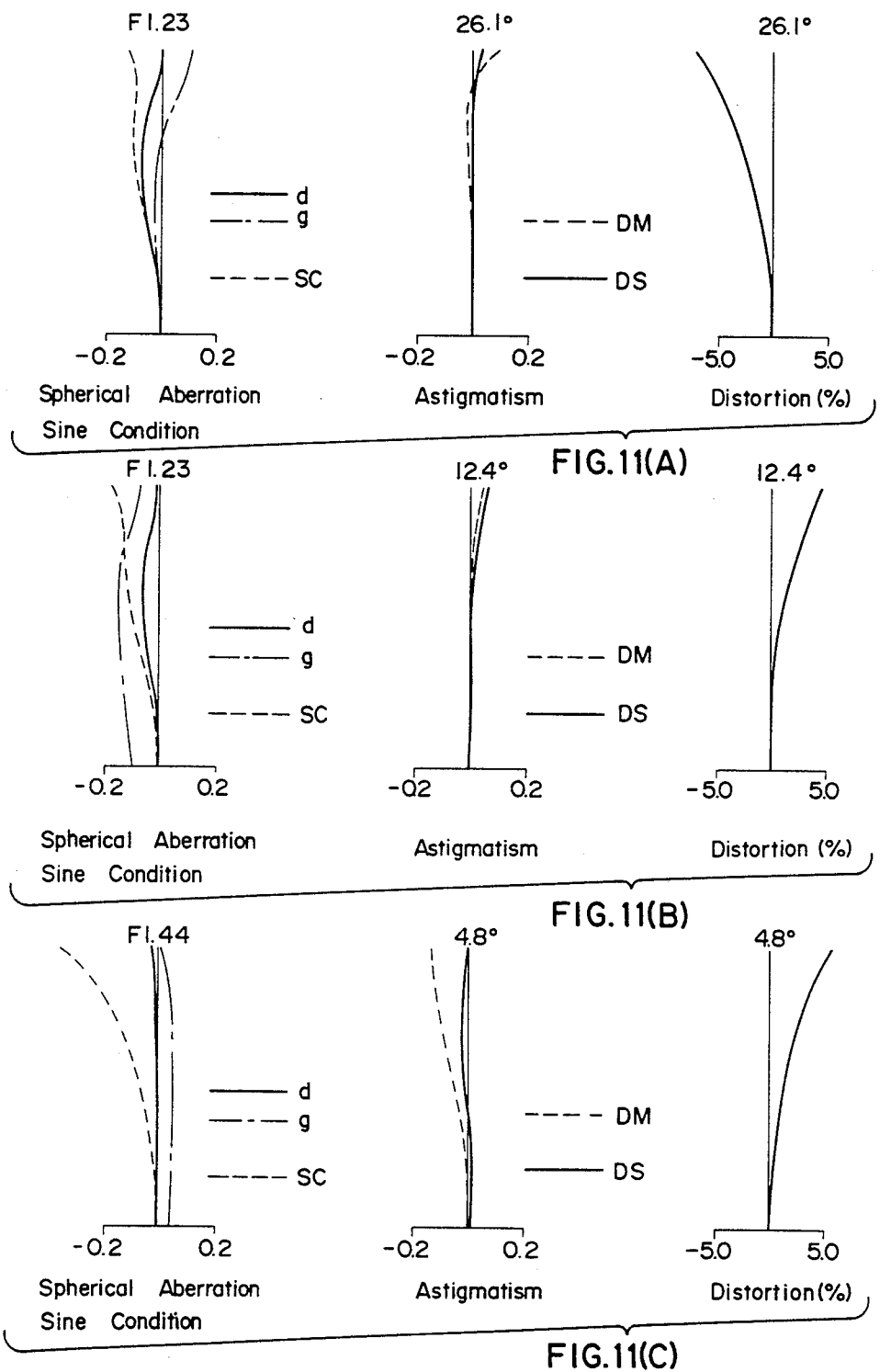
FIGS. 11(a) to 11(c) represent the aberration curves of the seventh embodiment for the shortest focal length, for the medium focal length and for the longest focal length.

According to the present invention, as shown in FIGS. 1, 2, 3 and 4, a large aperture ratio zoom lens system comprising from the object side to the image side, a first lens unit (I) of a positive refractive power which is fixed in the zooming operation and is shiftable along the optical axis in the focusing operation, a second lens unit (II) of a negative refractive power shiftable in the zooming operation as a variator lens unit, a third lens group (III) of a negative refractive power shiftable in the zooming operation as a compensator lens unit, a fourth lens unit (IV) of a positive refractive power fixed in the zooming operation for converting the divergent light bundles from the second and third lens units into afocal light bundles, and a fifth lens unit (V) of a positive refractive power fixed in the zooming operation. An aperture diaphragm (S) is located between the fourth lens unit (IV) and the fifth lens unit (V).

In this lens unit arrangement, it is necessary to shorten the total length and for decreasing the diameter of the first lens unit to increase the refractive power of the zooming portion consisting of the second lens unit (II) and the third lens unit (III). Especially, the shifting distance of the variator lens unit (II) can be decreased in accordance with increasing the refractive power of the variator lens unit (II). However, the increase of the refractive power in each lens units causes an increase in the aberrations produced in each lens units. Such produced aberrations are very large, and can not be compensated by known lens constructions or can be compensated by increasing excessively the number of lens components.

Therefore, in the present invention, the divergent light bundles from the zooming portion are converted to the almost afocal light bundles by the fourth lens unit (IV). The aberrations over-produced in the zooming portion are well corrected by the above operation of the fourth lens unit (IV) and by the construction of the fifth lens unit (V) described below.

The fourth lens unit (IV) consists of one or two positive lens components. The reason for converting the light bundles into the afocal light bundles by the fourth lens unit (IV) is explained below: If the divergent light bundles are transmitted to the fifth lens unit (V), the axial length and the diameter of the fifth lens unit (V) becomes too large, and the aberrations produced in the fifth lens unit (V) are increased undesirably. If the convergent light bundles are transmitted to the fifth lens unit (V), although it is possible to make the fifth lens unit (V) compact, the back focal distance becomes excessively short. And to obtain the sufficient back focal distance, the refractive power of the negative lens components in the fifth lens unit (V) must be increased excessively, and therefore coma in the off-axial region and flare in saggital plane are unfavorably produced.

Thus, according to the present invention, the fourth lens unit (IV) converts light bundles onto the afocal one for avoiding such problem. Furthermore, since changes of the optical performance in the lens system due to the manufacturing error in position of the fifth lens unit (V) is decreased, it is possible to adjust the position of the image plane by shifting the fifth lens unit (V) along the optical axis.

The fifth lens unit (V) consists of, from the object side, a front lens unit (VF) of a relatively weak negative refractive power, a rear lens unit (VR) of a relatively strong positive refractive power, for obtaining the sufficient back focal distance and for the telecentric arrangement. The front lens unit (VF) consists of, from the object side, a first lens component (LA) of a positive refractive power and a second lens component (LB) of a negative refractive power. The rear lens group (VR) consists of two lens components (LC) and (LE) of positive refractive power and one lens component (LD) of a negative refractive power. The following lens components arrangement of the fifth lens unit (V) is effective for correcting the aberrations well even if the aberrations generated in the first and fourth lens unit (I) to (IV) are large.

Namely, according to the present invention, the front lens unit (VF) contains the positive first lens component (LA) whose object side surface has a stronger refractive power than its image side surface has, and the negative second lens component (LB) whose object side surface has the stronger refractive power than its image side surface has. The rear lens unit (VR) contains, from the object side, a bi-convex third lens component (LC), a negative meniscus fourth lens component (LD) having the negative stronger refractive surface at the image side, and the positive fifth lens component (LE) having the stronger refractive power at the object side. And the large aperture ratio zoom lens system according to the present invention fulfills the following conditions:

$$0.6 < |\phi_{BP}|F_V < 1.4 \quad \phi_{BP} = \frac{N_B - 1}{r_{BP}} < 0 \quad (1)$$

$$1.2 < |\phi_{BP}|/\phi_{CF} < 2.5 \quad \phi_{CF} = \frac{1 - N_C}{r_{CF}} > 0 \quad (2)$$

wherein, $F_V$ represents the focal length of the fifth lens unit, $N_B$ represents the refractive index of the second lens component, $N_C$ represents the refractive index of the third lens component, $r_{BP}$ represents the radius of curvature of the object side surface of the second lens component, $r_{CF}$ represents the radius of curvature of the image side surface of the third lens component, $\phi_{BP}$ represents the refractive power of the object side surface of the second lens component, and $\phi_{CF}$ represents the refractive power of the image side surface of the third lens component.

Condition (1) relates to the second lens component (LB) in the fifth lens unit (V). The second lens component (LB) has the capability to correct the spherical aberration well. And the second lens component (LB) has an object side surface having a strong negative refractive power, and has the capability to correct the field curvature and so on in addition to the capability of well correcting the spherical aberration. Condition (1) limits the refractive power of the object side surface having a strong refractive power in the second lens component (LB). If the refractive power thereof becomes weak under the lower limit of condition (1), it is difficult to correct the spherical aberration well by the object side surface of the second lens component (LB). Thus, in order to correct the spherical aberration well, the other surfaces should be used for correcting the spherical aberration well, and it causes to deteriorate the other aberrations than the spherical aberration. On the other hand, if the refractive power of the object side surface of the second lens component (LB) is increased over the upper limit of condition (1), the compactness of the whole lens system is deteriorated by extending the back focal distance over the sufficient length, or by increasing the diameter of the rear lens goup (VR) of the fifth lens unit (V). And the contrast of the image formed on the image plane is deteriorated by increasing the flare in the safittal plane, or by generating high degree aberrations.

Condition (2) defines the refractive power of the object side surface of the second lens component (LB) with respect to the refractive power of the image side surface of the third lens component (LC). The object side surface of the second lens component (LB) generates a large positive spherical aberration, while the image side surface of the third lens component (LC) generates a large negative spherical aberration. Therefore, it is required to balance these spherical aberrations in order to well correct the spherical aberration on the image plane.

If the positive spherical aberration generated by the object side surface of the second lens component (LB) is decreased under the lower limit of condition (2), the amount of the spherical aberration in the middle region is increased, and therefore the contrast of the image is lowered. If the positive spherical aberration generated thereby is increased over the upper limit of condition (2), the spherical aberration of high degree is generated undesirably, and it causes to lower the contrast of the image. Furthermore, the sagittal flare in the off-axial region are also increased excessively, and permissive manufacturing error characteristics is deteriorated.

According to the present invention, the compactness of the lens system is achieved by constructing the fifth lens unit (V) as described above. Therefore, if the aberrations are generated excessively by the zooming portion when the refractive powers of each lens units in the zooming portion are increased for achieving the compactness, these aberration can be corrected sufficiently well.

The following condition is effective for obtaining the sufficient back focal distance and for maintaining the telecentric optical system.

$$0.15 < (T_{BC} + T_{CD})/F_V < 0.6 \quad (3)$$

wherein, $T_{BC}$ represents the axial distance between the second lens component (LB) and the third lens component (LC), and $T_{CD}$ represents the axial distance between the third lens component (LC) and the fourth lens component (LD).

If the lower limit of condition (3) is violated, the front focal point of the fifth lens unit (V) is shifted towards the object side over the object side surface of the first lens component (LA), and therefore, the aperture diaphragm (S) should be located near the front focal point of the fifth lens unit (V) for maintaining the telecentric arrangement. It requires to locate the fifth lens unit (V) far from the aperture diaphragm (S), and it causes to extend the total length of the whole lens system. If the upper limit of condition (3) is violated, the back focal distance is decreased undesirably, or the total length of the whole lens system is extended unfavorably.

Furthermore, the following conditions are effective.

$$1.0 < r_{DP}/r_{DF} < 3.0 \quad r_{DP}, r_{DF} > 0 \quad (4) \text{ O}$$

$\nu_B, \nu_D < 35$            (5)

wherein, $r_{DP}$ represents the radius of curvature of the object side surface of the fourth lens component, $r_{DF}$ represents the radius of curvature of the image side surface of the fourth lens component, $\nu_B$ represents the Abbe number of the second lens component, and $\nu_D$ represents the Abbe number of the fourth lens component.

Condition (4) relates to the fourth lens component (LD). The fourth lens component (LD) has a meniscus shape in which both lens surfaces are convex to the object side. Its shape is effective for correcting the field curvature, the distortion, and the longitudinal chromatic aberration. If the lower limit of condition (4) is violated, the above aberrations in the off-axial region can not be corrected well. If the upper limit of condition (4) is violated, the coma and the sagittal flare are generated excessively, and the error characteristics is also deteriorated.

Condition (5) limits the color dispersion of two negative lens components (LB) and (LD) in the fifth lens unit (V). The longitudinal chromatic aberration is corrected mainly by the second lens component (LB), while the lateral chromatic aberration is corrected mainly by the fourth lens component (LD). It is necessary for correcting the chromatic aberration to apply high dispersion material to both negative lens components (LB) and (LD).

The following Tables 1 to 8 disclose, respectively, the first through eighth embodiments of the present invention. In the Tables, f equals the focal length, r is the radius of curvature with respective sub numbers indicating the surfaces from the object to image side along the optical axis, d represents the axial distance and includes both the air spaces and the actual thickness of the lenses along the optical axis, N equals the refractive index and again, the sub numbers refer to the particular optical element from the object to image side, and finally, $\nu$ equals the Abbe number and the sub numbers refer to the specific lens elements from the object to image side. In the Tables, the total length is measured from the top surface of the lens system to the image plane. And the exit pupil position is designated by positive values when the exit pupil is located behind the image plane, while it is designated by negative values when the exit pupil is located in front of the image plane. In all embodiments, a plate corresponding to a low pass filter of a face plate is located behind the fifth lens group (V).

TABLE 1

[Embodiment 1]

$f = 8.6 \sim 50.4$    $F_{No} = 23 \sim 1.43$    $2w = 51° \sim 9.3°$

| | | | radius of curvature | axial distance | refractive index(Nd) | | Abbe number($\nu$d) |
|---|---|---|---|---|---|---|---|
| | | r1 | 71.522 | d1 1.600 | N1 1.80518 | $\nu$1 | 25.43 |
| | | r2 | 33.291 | d2 7.800 | N2 1.51680 | $\nu$2 | 64.12 |
| | I | r3 | −225.050 | d3 0.100 | | | |
| | | r4 | 35.754 | d4 5.250 | N3 1.69100 | $\nu$3 | 54.75 |
| | | r5 | 331.979 | d5* (Variable) | | | |
| | | r6 | 1065.109 | d6 0.800 | N4 1.77250 | $\nu$4 | 49.77 |
| | | r7 | 13.142 | d7 3.500 | | | |
| | II | r8 | −17.737 | d8 0.800 | N5 1.71700 | $\nu$5 | 47.86 |
| | | r9 | 13.217 | d9 3.800 | N6 1.80518 | $\nu$6 | 25.43 |
| | | r10 | −64.206 | d10* (Variable) | | | |
| | III | r11 | −29.135 | d11 0.900 | N7 1.66998 | $\nu$7 | 39.23 |
| | | r12 | −425.067 | d12* (Variable) | | | |
| | | r13 | 106.558 | d13 3.400 | | $\nu$8 | 50.31 |
| | IV | r14 | −26.686 | d14 2.500 | N8 1.72000 | | |
| | | r15 | (aperature) | d15 4.500 | | | |
| | | r16 | 22.581 | D16 3.700 | N9 1.69100 | $\nu$9 | 54.75 |
| | VF | r17 | −973.434 | d17 2.800 | | | |
| | | r18 | −19.172 | d18 1.300 | N10 1.80518 | $\nu$10 | 25.43 |
| | | r19 | −105.306 | d19 7.600 | | | |
| V | | r20 | 47.566 | d20 4.300 | N11 1.72900 | $\nu$11 | 53.48 |
| | | r21 | −31.532 | d21 0.100 | | | |
| | | r22 | 23.741 | d22 1.000 | N12 1.76182 | $\nu$12 | 26.55 |
| | VR | r23 | 1.655 | d23 2.200 | | | |
| | | r24 | 17.917 | d24 3.400 | N13 1.69100 | $\nu$13 | 54.75 |
| | | r25 | −130.248 | d25 5.000 | | | |
| | | r26 | ∞ | d26 4.000 | N14 1.51680 | $\nu$14 | 64.12 |
| | | r27 | ∞ | | | | |

| | f | 8.60 | 20.00 | 50.40 |
|---|---|---|---|---|
| | d5* | 1.00 | 14.734 | 23.654 |
| | d10* | 22.780 | 6.139 | 3.200 |
| | d12* | 4.574 | 7.480 | 1.500 | total length = 107.0 mm    exit pupil position = −355 mm

TABLE 2

[Embodiment 2]

$f = 8.6 \sim 50.2$    $F_{No} = 1.23 \sim 1.45$    $2w = 51° \sim 9.3°$

| | | | radius of curvature | axial distance | refractive index(Nd) | | Abbe number($\nu$d) |
|---|---|---|---|---|---|---|---|
| | | r1 | 58.480 | d1 1.600 | N1 1.80518 | $\nu$1 | 25.43 |
| | | r2 | 28.986 | d2 8.000 | N2 1.51680 | $\nu$2 | 64.12 |
| | I | r3 | −338.455 | d3 0.100 | | | |
| | | r4 | 30.342 | d4 5.600 | N3 1.71300 | $\nu$3 | 53.93 |
| | | r5 | 220.457 | d5* (Variable) | | | |

TABLE 2-continued

[Embodiment 2]

$f = 8.6 \sim 50.2$  $F_{No} = 1.23 \sim 1.45$  $2w = 51° \sim 9.3°$

| | | | radius of curvature | axial distance | | refractive index(Nd) | | Abbe number($\nu$d) |
|---|---|---|---|---|---|---|---|---|
| | | r6 | 357.143 | d6 | 0.800 | N4 1.77250 | $\nu$4 | 49.77 |
| | | r7 | 11.261 | d7 | 3.600 | | | |
| | II | r8 | −16.260 | d8 | 0.800 | N5 1.69100 | $\nu$5 | 54.75 |
| | | r9 | 13.333 | d9 | 3.500 | N6 1.80518 | $\nu$6 | 25.43 |
| | | r10 | −136.086 | d10* | (Variable) | | | |
| | III | r11 | −23.226 | d11 | 0.900 | N7 1.80741 | $\nu$7 | 31.59 |
| | | r12 | −230.519 | d12* | (Variable) | | | |
| | | r13 | −58.300 | d13 | 2.600 | N8 1.69100 | $\nu$8 | 54.75 |
| | | r14 | −22.541 | d14 | 0.100 | | | |
| | IV | r15 | 51.308 | d15 | 3.400 | N9 1.69100 | $\nu$9 | 54.75 |
| | | r16 | −51.308 | d16 | 0.500 | | | |
| | | r17 | ∞ | d17 | 7.000 | N10 1.51680 | $\nu$10 | 64.12 |
| | | r18 | ∞ | d18 | 2.500 | | | |
| | | r19 | (aperature) | d19 | 4.000 | | | |
| | VF | r20 | 30.868 | d20 | 3.700 | N11 1.69100 | $\nu$11 | 54.75 |
| | | r21 | −93.078 | d21 | 2.800 | | | |
| | | r22 | −22.961 | d22 | 1.200 | N12 1.80518 | $\nu$12 | 25.43 |
| | | r23 | −177.452 | d23 | 8.300 | | | |
| V | | r24 | 44.937 | d24 | 3.600 | N13 1.57250 | $\nu$13 | 57.54 |
| | | r25 | −31.220 | d25 | 0.100 | | | |
| | | r26 | 18.874 | d26 | 0.900 | N14 1.80518 | $\nu$14 | 25.43 |
| | | r27 | 11.610 | d27 | 2.800 | | | |
| | VR | r28 | 17.029 | d28 | 3.600 | N15 1.56883 | $\nu$15 | 56.04 |
| | | r29 | −72.643 | d29 | 5.000 | | | |
| | | r30 | ∞ | d30 | 4.000 | N16 1.51680 | $\nu$16 | 64.12 |
| | | r31 | ∞ | | | | | |
| | | f | | 8.62 | 20.00 | 50.20 | | |
| | | d5* | | 1.00 | 12.361 | 19.747 | | |
| | | d10* | | 20.282 | 7.033 | 2.900 | | |
| | | d12* | | 3.265 | 5.153 | 1.900 | | | total length = 112.0 mm    exit pupil position = −312 mm

TABLE 3

[Embodiment 3]

$F = 8.6 \sim 50.4$  $F_{No} = 1.23 \sim 1.41$  $2w = 51° \sim 9.3°$

| | | | radius of curvature | axial distance | | refractive index(Nd) | | Abbe number($\nu$d) |
|---|---|---|---|---|---|---|---|---|
| | | r1 | 72.993 | d1 | 1.600 | N1 1.80518 | $\nu$1 | 25.43 |
| | | r2 | 34.130 | d2 | 7.950 | N2 1.51680 | $\nu$2 | 64.12 |
| | I | r3 | −194.563 | d3 | 0.100 | | | |
| | | r4 | 34.699 | d4 | 5.300 | N3 1.69100 | $\nu$3 | 54.75 |
| | | r5 | 249.493 | d5* | (Variable) | | | |
| | | r6 | 504.405 | d6 | 0.900 | N4 1.78831 | $\nu$4 | 47.32 |
| | | r7 | 13.471 | d7 | 3.550 | | | |
| | II | r8 | −18.299 | d8 | 0.900 | N5 1.71700 | $\nu$5 | 47.86 |
| | | r9 | 13.885 | d9 | 3.550 | N6 1.80518 | $\nu$6 | 25.43 |
| | | r10 | −150.996 | d10* | (Variable) | | | |
| | III | r11 | −23.108 | d11 | 0.900 | N7 1.74400 | $\nu$7 | 44.93 |
| | | r12 | −291.284 | d12* | (Variable) | | | |
| | | r13 | −79.623 | d13 | 2.800 | N8 1.67000 | $\nu$8 | 57.07 |
| | | r14 | −23.190 | d14 | 0.100 | | | |
| | IV | r15 | 55.630 | d15 | 3.400 | N9 1.67000 | $\nu$9 | 57.07 |
| | | r16 | −55.630 | d16 | 0.500 | | | |
| | | r17 | ∞ | d17 | 7.000 | N10 1.51680 | $\nu$10 | 64.12 |
| | | r18 | ∞ | d18 | 2.500 | | | |
| | | r19 | (aperature) | d19 | 5.000 | | | |
| | VF | r20 | 23.362 | d20 | 3.700 | N11 1.69100 | $\nu$11 | 54.75 |
| | | r21 | 594.124 | d21 | 3.100 | | | |
| | | r22 | −23.426 | d22 | 1.200 | N12 1.80518 | $\nu$12 | 25.43 |
| | | r23 | −249.541 | d23 | 4.500 | | | |
| V | | r24 | 40.981 | d24 | 3.900 | N13 1.69100 | $\nu$13 | 54.75 |
| | | r25 | −34.893 | d25 | 1.290 | | | |
| | | r26 | 20.158 | d26 | 1.000 | N14 1.80518 | $\nu$14 | 25.43 |
| | | r27 | 10.719 | d27 | 4.600 | | | |
| | VR | r28 | 18.142 | d28 | 3.400 | N15 1.69100 | $\nu$15 | 54.75 |
| | | r29 | −92.655 | d29 | 5.000 | | | |
| | | r30 | ∞ | d30 | 4.000 | N16 1.51680 | $\nu$16 | 64.12 |
| | | r31 | ∞ | | | | | |
| | | f | | 8.60 | 20.00 | 50.40 | | |
| | | d5* | | 1.00 | 14.425 | 23.293 | | |
| | | d10* | | 24.712 | 9.026 | 2.800 | | |
| | | d12* | | 2.381 | 4.643 | 2.000 | | |

TABLE 3-continued

[Embodiment 3]

F = 8.6~50.4  F$_{No}$ = 1.23~1.41  2w = 51°~9.3°

| | radius of curvature | axial distance | refractive index(Nd) | Abbe number(νd) |
|---|---|---|---|---| total length = 115.2 mm   exit pupil position = −248 mm

TABLE 4

[Embodiment 4]

f = 8.6~50.4  F$_{No}$ = 1.23~1.41  2w = 51°~9.3°

| | | radius of curvature | | axial distance | | refractive index(Nd) | | Abbe number(νd) |
|---|---|---|---|---|---|---|---|---|
| I | r$_1$ | 72.993 | d1 | 1.600 | N1 | 1.80518 | ν1 | 25.43 |
| | r$_2$ | 34.130 | d2 | 7.950 | N2 | 1.51680 | ν2 | 64.12 |
| | r$_3$ | −194.563 | d3 | 0.100 | | | | |
| | r$_4$ | 34.699 | d4 | 5.300 | N3 | 1.69100 | ν3 | 54.75 |
| | r$_5$ | 249.493 | d5* | (Variable) | | | | |
| II | r$_6$ | 504.405 | d6 | 0.900 | N4 | 1.78831 | ν4 | 47.32 |
| | r$_7$ | 13.471 | d7 | 3.550 | | | | |
| | r$_8$ | −18.299 | d8 | 0.900 | N5 | 1.71700 | ν5 | 47.86 |
| | r$_9$ | 13.885 | d9 | 3.550 | N6 | 1.80518 | ν6 | 25.43 |
| | r$_{10}$ | −150.996 | d10* | (Variable) | | | | |
| III | r$_{11}$ | −23.108 | d11 | 0.900 | N7 | 1.74400 | ν7 | 44.93 |
| | r$_{12}$ | −291.284 | d12* | (Variable) | | | | |
| IV | r$_{13}$ | −78.268 | d13 | 2.800 | N8 | 1.67000 | ν8 | 57.07 |
| | r$_{14}$ | −23.590 | d14 | 0.100 | | | | |
| | r$_{15}$ | 54.287 | d15 | 3.400 | N9 | 1.67000 | ν9 | 57.07 |
| | r$_{16}$ | −54.287 | d16 | 0.500 | | | | |
| | r$_{17}$ | ∞ | d17 | 7.000 | N10 | 1.51680 | ν10 | 64.12 |
| | r$_{18}$ | ∞ | d18 | 2.500 | | | | |
| | r$_{19}$ | (aperature) | d19 | 5.000 | | | | |
| V / VF | r$_{20}$ | 27.695 | d20 | 3.700 | N11 | 1.69100 | ν11 | 54.75 |
| | r$_{21}$ | −142.376 | d21 | 3.100 | | | | |
| | r$_{22}$ | −24.051 | d22 | 1.200 | N12 | 1.80518 | ν12 | 25.43 |
| | r$_{23}$ | −383.524 | d23 | 8.800 | | | | |
| | r$_{24}$ | 48.846 | d24 | 3.400 | N13 | 1.69100 | ν13 | 54.75 |
| | r$_{25}$ | −34.965 | d25 | 0.100 | | | | |
| | r$_{26}$ | 21.856 | d26 | 1.000 | N14 | 1.80518 | ν14 | 25.43 |
| | r$_{27}$ | 11.794 | d27 | 2.500 | | | | |
| VR | r$_{28}$ | 18.081 | d28 | 3.300 | N15 | 1.69100 | ν15 | 54.75 |
| | r$_{29}$ | −152.333 | d29 | 5.000 | | | | |
| | r$_{30}$ | ∞ | d30 | 4.000 | N16 | 1.51680 | ν16 | 64.12 |
| | r$_{31}$ | ∞ | | | | | | |

| | | | |
|---|---|---|---|
| f | 8.60 | 20.00 | 50.40 |
| d5* | 1.00 | 14.425 | 23.293 |
| d10* | 24.712 | 9.026 | 2.800 |
| d12* | 2.381 | 4.643 | 2.000 | total length = 116.9 mm   exit pupil position = −597 mm

TABLE 5

[Embodiment 5]

f = 8.6~67.1  F$_{No}$ = 1.23~1.61  2w = 51°~7.0°

| | | radius of curvature | | axial distance | | refractive index(Nd) | | Abbe number(νd) |
|---|---|---|---|---|---|---|---|---|
| I | r$_1$ | 94.387 | d1 | 1.900 | N1 | 1.80518 | ν1 | 25.43 |
| | r$_2$ | 39.688 | d2 | 8.900 | N2 | 1.51680 | ν2 | 64.12 |
| | r$_3$ | −133.487 | d3 | 0.100 | | | | |
| | r$_4$ | 35.911 | d4 | 6.200 | N3 | 1.71300 | ν3 | 53.93 |
| | r$_5$ | 165.613 | d5* | (Variable) | | | | |
| II | r$_6$ | 198.986 | d6 | 0.900 | N4 | 1.77250 | ν4 | 49.77 |
| | r$_7$ | 14.756 | d7 | 3.700 | | | | |
| | r$_8$ | −22.942 | d8 | 0.900 | N5 | 1.71300 | ν5 | 53.93 |
| | r$_9$ | 14.799 | d9 | 3.500 | N6 | 1.80518 | ν6 | 25.43 |
| | r$_{10}$ | 11145.304 | d10* | (Variable) | | | | |
| III | r$_{11}$ | −19.862 | d11 | 0.900 | N7 | 1.80500 | ν7 | 40.97 |
| | r$_{12}$ | −125.775 | d12* | (Variable) | | | | |
| IV | r$_{13}$ | −107.517 | d13 | 3.100 | N8 | 1.71300 | ν8 | 53.93 |
| | r$_{14}$ | −26.741 | d14 | 0.100 | | | | |
| | r$_{15}$ | 42.021 | d15 | 3.300 | N9 | 1.71300 | ν | 53.93 |
| | r$_{16}$ | −300.840 | d16 | 2.500 | | | | |
| | r$_{17}$ | (aperature) | d17 | 6.500 | | | | |
| VF | r$_{18}$ | 32.312 | d18 | 4.200 | N10 | 1.58913 | ν10 | 61.41 |
| | r$_{19}$ | −111.816 | d19 | 3.300 | | | | |
| | r$_{20}$ | −22.999 | d20 | 1.300 | N11 | 1.80518 | ν11 | 25.43 |
| | r$_{21}$ | −74.994 | d21 | 9.100 | | | | |

TABLE 5-continued

[Embodiment 5]

f = 8.6~67.1   F_No = 1.23~1.61   2w = 51°~7.0°

| | | | radius of curvature | axial distance | refractive index(Nd) | | Abbe number(νd) | |
|---|---|---|---|---|---|---|---|---|
| V | | r22 | 71.998 | d22 4.100 | N12 | 1.71300 | ν12 | 53.93 |
| | | r23 | −32.871 | d23 0.100 | | | | |
| | | r24 | 18.932 | d24 1.000 | N13 | 1.78472 | ν13 | 25.75 |
| | VR | r25 | 10.635 | d25 2.400 | | | | |
| | | r26 | 12.253 | d26 4.000 | N14 | 1.61762 | ν14 | 52.70 |
| | | r27 | −54.315 | d27 5.000 | | | | |
| | | r28 | ∞ | d28 4.000 | N15 | 1.51680 | ν15 | 64.12 |
| | | r29 | ∞ | | | | | |
| | | f | | 8.62 | 28.00 | 67.10 | | |
| | | d5* | | 1.00 | 19.038 | 26.288 | | |
| | | d10* | | 24.497 | 5.173 | 3.500 | | |
| | | d12* | | 6.291 | 7.577 | 2.000 | | |
| | | total length = 121.4 mm | | | exit pupil position = −462 mm | | | |

TABLE 6

[Embodiment 6]

f = 6.1~35.2   F_No = 1.03~1.11   2w = 49.3°~9.1°

| | | | radius of curvature | axial distance | refractive index(Nd) | | Abbe number(νd) | |
|---|---|---|---|---|---|---|---|---|
| | | r1 | 57.009 | d1 1.400 | N1 | 1.80518 | ν1 | 25.43 |
| | | r2 | 26.690 | d2 7.450 | N2 | 1.51680 | ν2 | 64.12 |
| | I | r3 | −138.664 | d3 0.100 | | | | |
| | | r4 | 25.402 | d4 5.550 | N3 | 1.69100 | ν3 | 54.75 |
| | | r5 | 153.172 | d5* (Variable) | | | | |
| | | r6 | 180.131 | d6 0.800 | N4 | 1.78881 | ν4 | 47.32 |
| | | r7 | 10.220 | d7 3.050 | | | | |
| | II | r8 | −13.265 | d8 0.800 | N5 | 1.71700 | ν5 | 47.86 |
| | | r9 | 11.452 | d9 3.400 | N6 | 1.80518 | ν6 | 25.43 |
| | | r10 | −218.820 | d10* (Variable) | | | | |
| | III | r11 | −17.204 | d11 0.800 | N7 | 1.78100 | ν7 | 44.55 |
| | | r12 | −147.677 | d12* (Variable) | | | | |
| | | r13 | −42.238 | d13 2.600 | N8 | 1.71300 | ν8 | 53.93 |
| | | r14 | −18.197 | d14 0.100 | | | | |
| | IV | r15 | 41.755 | d15 3.400 | N9 | 1.71300 | ν9 | 53.93 |
| | | r16 | −14.755 | d16 0.500 | | | | |
| | | r17 | ∞ | d17 6.000 | N10 | 1.51680 | ν10 | 64.12 |
| | | r18 | ∞ | d18 2.000 | | | | |
| | | r19 | (aperature) | d19 3.000 | | | | |
| | | r20 | 23.969 | d20 3.700 | N11 | 1.69100 | ν11 | 54.75 |
| | VF | r21 | −90.513 | d21 2.200 | | | | |
| | | r22 | −17.118 | d22 0.900 | N12 | 1.80518 | ν12 | 25.43 |
| | | r23 | 188.249 | d23 5.200 | | | | |
| V | | r24 | 32.366 | d24 3.900 | N13 | 1.69100 | ν13 | 54.75 |
| | | r25 | −27.716 | d25 0.100 | | | | |
| | | r26 | 17.075 | d26 0.900 | N14 | 1.80518 | ν14 | 25.43 |
| | | r27 | 9.155 | d27 1.900 | | | | |
| | VR | r28 | 12.745 | d28 3.300 | N15 | 1.69100 | ν15 | 54.75 |
| | | r29 | −91.585 | d29 4.000 | | | | |
| | | r30 | ∞ | d30 2.800 | N16 | 1.51680 | ν16 | 64.12 |
| | | r31 | ∞ | | | | | |
| | | f | | 6.13 | 14.00 | 35.20 | | |
| | | d5* | | 1.000 | 10.290 | 16.488 | | |
| | | d10* | | 17.578 | 6.780 | 2.600 | | |
| | | d12* | | 2.309 | 3.817 | 1.800 | | |
| | | total length = 95.0 mm | | | exit pupil position = −774 mm | | | |

TABLE 7

[Embodiment 7]

f = 11.2~65.0   F_No = 1.23~1.44   2w = 52.3°~9.7°

| | | | radius of curvature | axial distance | refractive index(Nd) | | Abbe number(νd) | |
|---|---|---|---|---|---|---|---|---|
| | | r1 | 162.613 | d1 2.000 | N1 | 1.80518 | ν1 | 25.43 |
| | | r2 | 46.557 | d2 9.300 | N2 | 1.69180 | ν2 | 54.75 |
| | I | r3 | −160.769 | d3 0.100 | | | | |
| | | r4 | 40.600 | d4 5.400 | N3 | 1.69100 | ν3 | 54.75 |
| | | r5 | 120.128 | d5* (Variable) | | | | |
| | | r6 | 363.669 | d6 1.000 | N4 | 1.77250 | ν4 | 49.77 |
| | | r7 | 17.144 | d7 4.450 | | | | |
| | II | r8 | −21.412 | d8 1.000 | N5 | 1.69100 | ν5 | 54.75 |
| | | r9 | 18.524 | d9 4.000 | N6 | 1.80518 | ν6 | 25.43 |
| | | r10 | −686.341 | d10* (Variable) | | | | |

TABLE 7-continued

[Embodiment 7]

$f = 11.2 \sim 65.0$  $F_{No} = 1.23 \sim 1.44$  $2w = 52.3° \sim 9.7°$

| | | radius of curvature | axial distance | | refractive index(Nd) | | Abbe number($\nu$d) |
|---|---|---|---|---|---|---|---|
| III | $r_{11}$ | −26.942 | d11 | 1.000 | N7 1.77551 | $\nu 7$ | 37.90 |
| | $r_{12}$ | −208.243 | d12* | (Variable) | | | |
| IV | $r_{13}$ | −477.327 | d13 | 4.200 | N8 1.69100 | $\nu 8$ | 54.75 |
| | $r_{14}$ | −30.266 | d14 | 0.100 | | | |
| | $r_{15}$ | 72.735 | d15 | 4.200 | N9 1.69100 | $\nu$ | 54.75 |
| | $r_{16}$ | −72.735 | d16 | 2.500 | | | |
| | $r_{17}$ | (aperature) | d17 | 7.000 | | | |
| V VF | $r_{18}$ | 36.015 | d18 | 4.300 | N10 1.69100 | $\nu 10$ | 54.75 |
| | $r_{19}$ | −2984.094 | d19 | 3.800 | | | |
| | $r_{20}$ | −27.206 | d20 | 1.300 | N11 1.80518 | $\nu 11$ | 25.43 |
| | $r_{21}$ | −145.916 | d21 | 9.900 | | | |
| VR | $r_{22}$ | 54.202 | d22 | 4.600 | N12 1.69100 | $\nu 12$ | 54.75 |
| | $r_{23}$ | −43.540 | d23 | 0.100 | | | |
| | $r_{24}$ | 24.771 | d24 | 1.200 | N13 1.80518 | $\nu 13$ | 25.43 |
| | $r_{25}$ | 14.522 | d25 | 3.000 | | | |
| | $r_{26}$ | 27.815 | d26 | 3.700 | N14 1.69100 | $\nu 14$ | 54.75 |
| | $r_{27}$ | −158.588 | d27 | 8.000 | | | |
| | $r_{28}$ | ∞ | d28 | 5.000 | N15 1.51680 | $\nu 15$ | 64.12 |
| | $r_{29}$ | ∞ | | | | | |
| | f | | 11.25 | 25.00 | 65.00 | | |
| | d5* | | 1.200 | 16.875 | 28.324 | | |
| | d10* | | 30.219 | 11.949 | 3.500 | | |
| | d12* | | 2.605 | 5.200 | 2.200 | | | total length = 132.8 mm    exit pupil position = −227 mm

TABLE 8

[Embodiment 8]

$f = 11.3 \sim 50.2$  $F_{No} = 1.23 \sim 1.45$  $2w = 51.9° \sim 9.7°$

| | | radius of curvature | axial distance | | refractive index(Nd) | | Abbe number($\nu$d) |
|---|---|---|---|---|---|---|---|
| I | $r_1$ | 103.845 | d1 | 2.000 | N1 1.80518 | $\nu 1$ | 25.43 |
| | $r_2$ | 42.738 | d2 | 9.750 | N2 1.51680 | $\nu 2$ | 64.12 |
| | $r_3$ | −192.425 | d3 | 0.100 | | | |
| | $r_4$ | 40.665 | d4 | 6.700 | N3 1.69100 | $\nu 3$ | 54.75 |
| | $r_5$ | 279.593 | d5* | (Variable) | | | |
| II | $r_6$ | 833.333 | d6 | 1.000 | N4 1.78831 | $\nu 4$ | 47.32 |
| | $r_7$ | 16.582 | d7 | 4.500 | | | |
| | $r_8$ | −21.606 | d8 | 1.000 | N5 1.69100 | $\nu 5$ | 54.75 |
| | $r_9$ | 19.389 | d9 | 4.000 | N6 1.80518 | $\nu 6$ | 25.43 |
| | $r_{10}$ | −198.117 | d10* | (Variable) | | | |
| III | $r_{11}$ | −25.849 | d11 | 1.000 | N7 1.78560 | $\nu 7$ | 42.81 |
| | $r_{12}$ | −250.313 | d12* | (variable) | | | |
| IV | $r_{13}$ | −17.001 | d13 | 3.400 | N8 1.69100 | $\nu 8$ | 54.75 |
| | $r_{14}$ | −27.861 | d14 | 0.100 | | | |
| | $r_{15}$ | 55.349 | d15 | 5.300 | N9 1.69100 | $\nu 9$ | 54.75 |
| | $r_{16}$ | −55.349 | d16 | 0.500 | | | |
| | $r_{17}$ | ∞ | d17 | 10.000 | N10 1.51680 | $\nu 10$ | 64.12 |
| | $r_{18}$ | ∞ | d18 | 2.500 | | | |
| | $r_{19}$ | (aperature) | d19 | 7.000 | | | |
| V VF | $r_{20}$ | 33.968 | d20 | 4.300 | N11 1.69100 | $\nu 11$ | 54.75 |
| | $r_{21}$ | 417.597 | d21 | 3.800 | | | |
| | $r_{22}$ | −25.049 | d22 | 1.300 | N12 1.80518 | $\nu 12$ | 25.43 |
| | $r_{23}$ | −159.122 | d23 | 9.800 | | | |
| VR | $r_{24}$ | 79.388 | d24 | 4.300 | N13 1.69100 | $\nu 13$ | 54.75 |
| | $r_{25}$ | −36.571 | d25 | 0.100 | | | |
| | $r_{26}$ | 28.298 | d26 | 1.200 | N14 1.80518 | $\nu 14$ | 25.43 |
| | $r_{27}$ | 15.571 | d27 | 3.000 | | | |
| | $r_{28}$ | 26.329 | d28 | 4.000 | N15 1.69100 | $\nu 15$ | 54.75 |
| | $r_{29}$ | −130.887 | d29 | 8.000 | | | |
| | $r_{30}$ | ∞ | d30 | 5.000 | N16 1.51680 | $\nu 16$ | 64.12 |
| | $r_{31}$ | ∞ | | | | | |
| | f | | 11.25 | 25.00 | 65.00 | | |
| | d5* | | 1.340 | 17.027 | 28.500 | | |
| | d10* | | 30.328 | 12.372 | 3.500 | | |
| | d12* | | 2.531 | 4.800 | 2.200 | | | total length = 146.1 mm    exit pupil position = −293 mm

What is claimed is:

1. A large aperture ratio zoom lens system, comprising from the object side to the image side;
a first lens unit of a positive refractive power fixed in the zooming operation;
a second lens unit of a negative refractive power;
a third lens unit of a negative refractive power;

a fourth lens unit of a positive refractive power;
an aperture diaphragm; and
a fifth lens unit of positive refractive power, including a front lens unit consisting of a positive first lens component whose object side surface has stronger refractive power than its image side surface has and a negative second lens component whose object side surface has stronger refractive power than its image side surface has, and a rear lens unit consisting of a biconvex third lens component, a negative meniscus fourth lens component whose image side surface has stronger refractive power than its object side surface has, and a positive fifth lens component whose object side surface has stronger refractive power than its image side surface has;
wherein the second lens unit and the third lens unit are shiftable along the optical axis in the zooming operation;
and wherein the lens system fulfills the following conditions:

$$0.6 < |\phi_{BP}|F_V < 1.4 \qquad \phi_{BP} = \frac{N_B - 1}{r_{BP}} < 0$$

$$1.2 < |\phi_{BP}|/\phi_{CF} < 2.5 \qquad \phi_{CF} = \frac{1 - N_C}{r_{CF}} < 0$$

wherein,
$F_V$: the focal length of the fifth lens unit,
$N_B$: the refractive index of the second lens component,
$N_C$: the refractive index of the third lens component,
$r_{BP}$: the radius of curvature of the object side surface of the second lens component,
$r_{CF}$: the radius of curvature of the image side surface of the third lens component,
$\phi_{BP}$: the refractive power of the object side surface of the second lens component, and
$\phi_{CF}$: the refractive power of the image side surface of the third lens component.

2. A large aperture ratio zoom lens system as claimed in claim 1, wherein the lens system fulfills the following condition:

$$0.15 < (T_{BC} + T_{CD})/F_V < 0.6$$

wherein,
$T_{BC}$: the axial distance between the second lens component and the third lens component in the fifth lens unit; and
$T_{CD}$: the axial distance between the third lens component and the fourth lens component in the fifth lens unit.

3. A large aperture ratio zoom lens system as claimed in claim 2, wherein the lens system fulfills the following conditions:

$$1.0 < r_{DP}/r_{DF} < 3.0 \quad r_{DP}, r_{DF} > 0$$

$$\nu_B, \nu_D < 35$$

wherein,
$r_{DP}$: the radius of curvature of the object side surface of the fourth lens component,
$r_{DF}$: the radius of curvature of the image side surface of the fourth lens component,
$\nu_B$: the Abbe number of the second lens component, and
$\nu_D$: the Abbe number of the fourth lens component.

4. A large aperture ratio zoom lens system as claimed in claim 1, wherein the lens system defined the following design parameters:

|   |   |   | radius of curvature | | axial distance | refractive index(Nd) | | Abbe number(νd) | |
|---|---|---|---|---|---|---|---|---|---|
|   | I | $r_1$ | 71.522 | $d_1$ | 1.600 | N1 | 1.80518 | ν1 | 25.43 |
|   |   | $r_2$ | 33.291 | $d_2$ | 7.800 | N2 | 1.51680 | ν2 | 64.12 |
|   |   | $r_3$ | −225.050 | $d_3$ | 0.100 |   |   |   |   |
|   |   | $r_4$ | 35.574 | $d_4$ | 5.250 | N3 | 1.69100 | ν3 | 54.75 |
|   |   | $r_5$ | 331.979 | $d_5^*$ | (Variable) |   |   |   |   |
|   | II | $r_6$ | 1065.109 | $d_6$ | 0.800 | N4 | 1.77250 | ν4 | 49.77 |
|   |   | $r_7$ | 13.142 | $d_7$ | 3.500 |   |   |   |   |
|   |   | $r_8$ | −17.737 | $d_8$ | 0.800 | N5 | 1.71700 | ν5 | 47.86 |
|   |   | $r_9$ | 13.217 | $d_9$ | 3.800 | N6 | 1.80518 | ν6 | 25.43 |
|   |   | $r_{10}$ | −64.206 | $d_{10}^*$ | (Variable) |   |   |   |   |
|   | III | $r_{11}$ | −29.135 | $d_{11}$ | 0.900 | N7 | 1.66998 | ν7 | 39.23 |
|   |   | $r_{12}$ | −425.067 | $d_{12}^*$ | (Variable) |   |   |   |   |
|   | IV | $r_{13}$ | 106.558 | $d_{13}$ | 3.400 | N8 | 1.72000 | ν8 | 50.31 |
|   |   | $r_{14}$ | −26.686 | $d_{14}$ | 2.500 |   |   |   |   |
|   |   | $r_{15}$ | (aperature) | $d_{15}$ | 4.500 |   |   |   |   |
| V | $V_F$ | $r_{16}$ | 22.581 | $D_{16}$ | 3.700 | N9 | 1.69100 | ν9 | 54.75 |
|   |   | $r_{17}$ | −973.434 | $d_{17}$ | 2.800 |   |   |   |   |
|   |   | $r_{18}$ | −19.172 | $d_{18}$ | 1.300 | N10 | 1.80518 | ν10 | 25.43 |
|   |   | $r_{19}$ | −105.306 | $d_{19}$ | 7.600 |   |   |   |   |
|   | $V_R$ | $r_{20}$ | 47.566 | $d_{20}$ | 4.300 | N11 | 1.72900 | ν11 | 53.48 |
|   |   | $r_{21}$ | −31.532 | $d_{21}$ | 0.100 |   |   |   |   |
|   |   | $r_{22}$ | 23.741 | $d_{22}$ | 1.000 | N12 | 1.76182 | ν12 | 26.55 |
|   |   | $r_{23}$ | 11.655 | $d_{23}$ | 2.200 |   |   |   |   |
|   |   | $r_{24}$ | 17.917 | $d_{24}$ | 3.400 | N13 | 1.69100 | ν13 | 54.75 |
|   |   | $r_{25}$ | −130.240 | $d_{25}$ | 5.000 |   |   |   |   |
|   |   | $r_{26}$ | ∞ | $d_{26}$ | 4.000 | N14 | 1.51680 | ν14 | 64.12 |
|   |   | $r_{27}$ | ∞ |   |   |   |   |   |   |
|   |   | f |   | 8.60 | 20.00 | 50.40 |   |   |   |
|   |   | $d_5^*$ |   | 1.00 | 14.734 | 23.654 |   |   |   |
|   |   | $d_{10}^*$ |   | 22.780 | 6.139 | 3.200 |   |   |   |
|   |   | $d_{12}^*$ |   | 4.574 | 7.480 | 1.500 |   |   |   |
|   |   | total length = 107.0 mm | | | exit pupil position = −355 mm | | | | | |

* * * * *